(12) United States Patent
Oksman et al.

(10) Patent No.: US 8,638,302 B2
(45) Date of Patent: Jan. 28, 2014

(54) APPARATUS WITH MULTIPLE DISPLAYS

(75) Inventors: Markku Oksman, Turku (FI); Tomas Ivaskevicius, Helsinki (FI); Kim Heikkinen, Helsinki (FI); Tomi Kapiainen, Helsinki (FI); Jenni Väänänen, Helsinki (FI); Kaisa Ruotsalainen, Helsinki (FI)

(73) Assignee: Nokia Corporation, Espoo (FI)

( * ) Notice: Subject to any disclaimer, the term of this patent is extended or adjusted under 35 U.S.C. 154(b) by 565 days.

(21) Appl. No.: 12/645,109

(22) Filed: Dec. 22, 2009

(65) Prior Publication Data

US 2011/0148772 A1     Jun. 23, 2011

(51) Int. Cl.
*G06F 3/041*     (2006.01)
(52) U.S. Cl.
USPC .......................................... 345/173; 345/1.3
(58) Field of Classification Search
None
See application file for complete search history.

(56) References Cited

U.S. PATENT DOCUMENTS

| | | | |
|---|---|---|---|
| 6,608,996 B1 | 8/2003 | Laurikka et al. | |
| 7,545,627 B1 | 6/2009 | Lantigua | |
| 2003/0169212 A1 | 9/2003 | Nishihara | |
| 2005/0040753 A1 | 2/2005 | Osame et al. | |
| 2005/0237699 A1 | 10/2005 | Carroll | |
| 2007/0106950 A1* | 5/2007 | Hutchinson et al. | 345/1.1 |
| 2008/0311958 A1 | 12/2008 | Oswald et al. | |
| 2009/0190295 A1 | 7/2009 | Chin et al. | |
| 2009/0286573 A1* | 11/2009 | Jang et al. | 455/566 |
| 2010/0156887 A1 | 6/2010 | Lindroos et al. | |

FOREIGN PATENT DOCUMENTS

| | | |
|---|---|---|
| GB | GB 2448981 A | 11/2008 |
| WO | WO2006045987 | 5/2006 |
| WO | WO 2007/098141 | 8/2007 |

OTHER PUBLICATIONS

PCT International Search Report of PCT/FI2010/050768—Date of Completion of Search: Nov. 16, 2010, 5 pages.
Supplementary European Search Report of European Application No. EP 10838730—Date of Completion of Search: Jan. 25, 2013, 4 pages.

* cited by examiner

*Primary Examiner* — Wayne Young
*Assistant Examiner* — Brian Butcher
(74) *Attorney, Agent, or Firm* — Locke Lord LLP

(57) ABSTRACT

An apparatus including a first surface having at least one display, a second surface having at least one display, and a third surface having at least one display. The first, second and third surface form an outer surface of the apparatus, the outer surface being generally of a triangular shape.

32 Claims, 3 Drawing Sheets

APPARATUS WITH MULTIPLE DISPLAYS

TECHNICAL FIELD

The present invention generally relates to apparatuses having multiple displays.

BACKGROUND ART

Currently, the mobile handheld devices in the market are increasingly used for different functions, for example, browsing in the internet, making phone calls, viewing different media content, listening to music or radio, preparing presentations or documents, sending email, as well as using clock and calendar functions. The different functions place various requirements on the user interface of the devices. One common requirement is a big display with a convenient viewing angle.

SUMMARY

According to a first example aspect of the invention there is provided an apparatus comprising:
a first surface having at least one display;
a second surface having at least one display; and
a third surface having at least one display, wherein
said first, second and third surface form an outer surface of the apparatus, the outer surface being generally of a triangular shape.

The outer surface being generally of a triangular shape may mean that the cross section of the apparatus generally is a triangle or resembles a triangle. The triangular shape provides a convenient viewing angle for many applications. The first, second and third surfaces may be configured such that they are mostly, or even completely, covered by the displays.

In certain example embodiments, at least one of the first, second and third surfaces is substantially planar. The term substantially planar may here mean either a straight plane or a slightly curved plane. In certain example embodiments, at least one other of the first, second and third surfaces is either convex or concave. In certain example embodiments, each of the surfaces are substantially planar. In certain example embodiments, each of the surfaces are straight planes.

In certain example embodiments, at least one of the first, second and third surfaces is bigger than the other surfaces. The bigger surface may be substantially planar providing a planar display.

In certain example embodiments, at least one of the displays is a touch display. In certain example embodiments, two or all of the displays are touch displays.

In certain example embodiments, the apparatus is configured to show same content in at least two of the displays.

In certain example embodiments, the apparatus is configured to show a first part of a content in one of the displays and a second part of the content in another one of the displays.

In certain example embodiments, the apparatus is configured to show an icon or a link to a content in one of the displays and to show the content in another one of the displays.

In certain example embodiments, the apparatus is configured to show an icon or a link to a content in one of the displays and to activate the content in another one of the displays from the icon or link.

In certain example embodiments, the apparatus is configured to transfer information, such as icons, links, data or content, between the displays as controlled by a user.

In certain example embodiments, the apparatus is configured to provide a user with a function in which the user drags information from one of the displays to another one of the displays.

In certain example embodiments, the displays are configured to operate independently.

In certain example embodiment, the displays are configured to operate dependently. In certain example embodiments, at least two of said displays form one continuous bigger display, wherein the formed display extends over at least one border between two of the first, second and third surfaces, for example, the border of the first and second surface.

When a part of the content is shown in one display and the next part in another one of the displays, the user may continue reading the content on another side of the device by flipping it. The apparatus may for example contain two bigger displays, main displays, which can be alternately used for reading a newspaper, a book or a comparable content. In an example embodiment, still images or video contained in a document are shown in one of the displays and textual matter of the same document are shown in another one of the displays. In certain example embodiments, the apparatus is configured so that the user of the apparatus may modify the content shown on the displays, e.g., drag icons to a smaller display at another side of the apparatus. In certain example embodiments, the apparatus is configured to allow the user to define an appearance that is constantly shown in a display. As an example, the apparatus may constantly show radio information and/or a clock and/or a calendar in one of the displays.

In certain example embodiments, information may be dragged from one display into another display by using a finger or stylus. The individual user may for example this way modify the displays according to her/his preferences.

The displays may be different in shape and size. In certain example embodiments, there may be more than three displays, such as four displays. In certain embodiments, there may be display(s) on at least two of the surfaces. In certain example embodiments, there may be less than three displays, such as display(s) on two of the surfaces only. Accordingly, a certain example aspect provides an apparatus comprising the first, second and third surfaces, wherein the surfaces form an outer surface of the apparatus, the outer surface being generally of a triangular shape, but where only two of said surfaces comprise a display or displays. The display(s) on one of the surfaces is omitted.

The apparatus may be an electrical device. It may be a mobile handheld device, a mobile communication device or a smaller computing device. It may be a mobile terminal, mobile communicator, a PDA device, a mobile phone, or an e-book, or similar.

In another example aspect of the invention, there is provided a computer program embodied on a computer readable medium comprising computer executable program code which, when executed by at least one processor of an apparatus comprising a first surface having at least one display, a second surface having at least one display, and a third surface having at least one display, wherein said first, second and third surface form an outer surface of the apparatus, the outer surface being generally of a triangular shape, causes the apparatus to perform:
operating the apparatus and controlling the use of each of the displays.

According to yet another example aspect of the invention there is provided a memory medium carrying the computer program of the foregoing example aspect. The memory medium may be a digital data storage such as a data disc or diskette, optical storage, magnetic storage, holographic storage, phase-change storage (PCM) or opto-magnetic storage. The memory medium may be formed into a device without other substantial functions than storing memory or it may be formed as part of a device with other functions, including but not limited to a memory of a computer, a chip set, and a sub assembly of an electronic device.

Correspondingly, an example aspect implementing a method for controlling the use of the displays may be provided. Accordingly, in accordance with yet another example aspect of the invention, there is provided a method comprising:

operating an apparatus comprising a first surface having at least one display, a second surface having at least one display, and a third surface having at least one display, wherein said first, second and third surface form an outer surface of the apparatus, the outer surface being generally of a triangular shape; and controlling the use of each of the displays.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
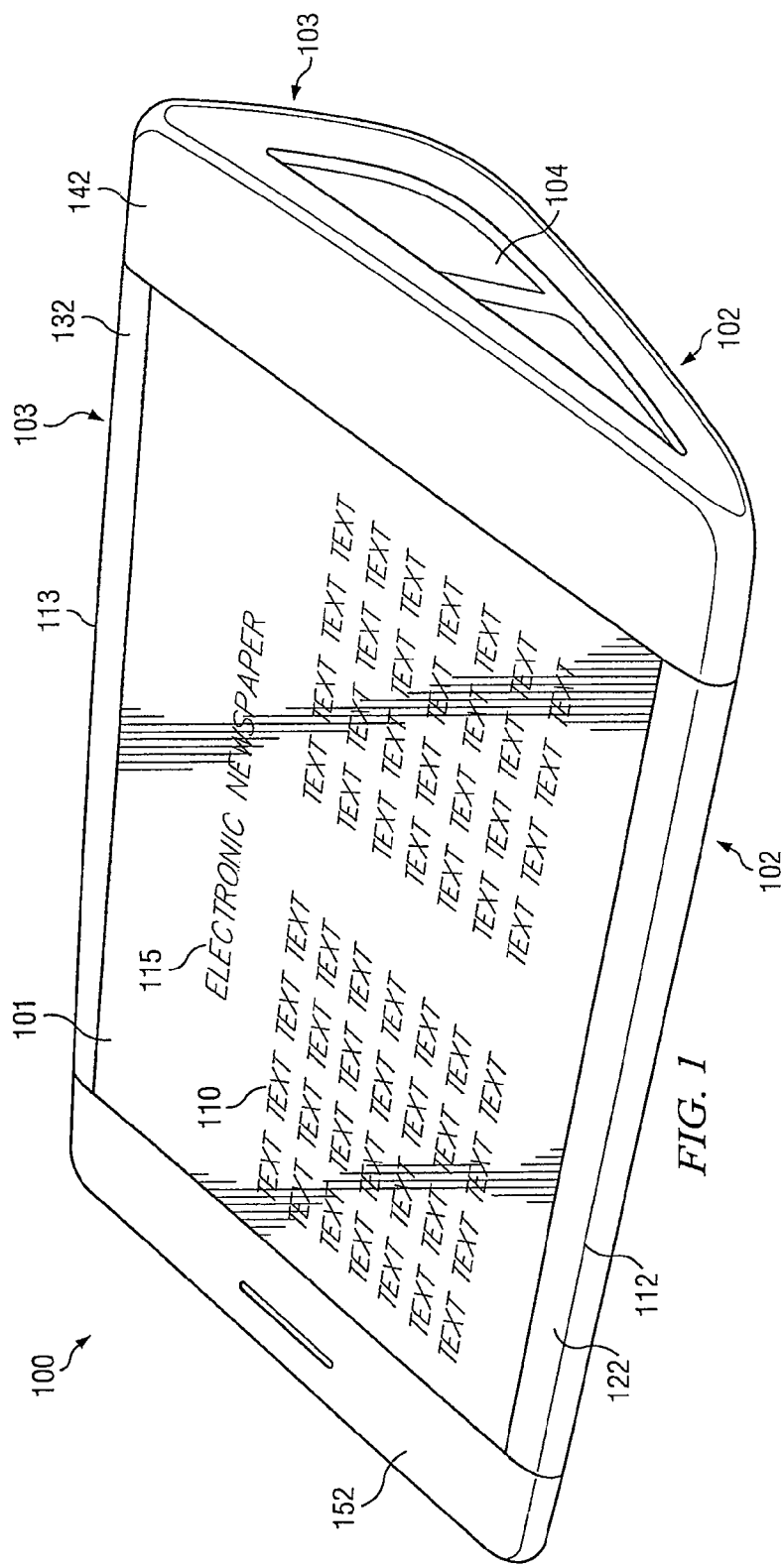
FIG. 1 shows a schematic drawing of an apparatus standing in a first operating position according to an example embodiment.

FIG. 1 shows a schematic drawing of an apparatus standing in a first operating position according to an example embodiment. In this example, the apparatus 100 is a mobile handheld electronic device. It comprises a first surface 101, which in this example is a planar surface providing a first display 110. In this example, the first display 110 is a touch display, but other display types are possible. The first surface may be rounded from its edged or border areas. Alternatively, the first surface 101 may be slightly convex or concave.

The apparatus 100 further comprises a second surface 102. The second surface is located at the bottom side of the apparatus when standing in the position shown in FIG. 1. The second surface 102 comprises a second display as will be described later in the description.

The apparatus 100 further comprises a third surface 103. The third surface is located at the rear side of the apparatus when standing in the position shown in FIG. 1. The third surface 103 comprises a third display as will be described later in the description.

The second and third surfaces 102-103 can be planar surfaces, or mainly planar surfaces that have been rounded. Alternatively, one or both of them may be convex or concave.

The first, second and third surface 101-103 form an outer surface of the apparatus, the outer surface being generally of a triangular shape. When in the first operating position shown in FIG. 1, a convenient viewing angle from the front of the device to the main display 110 of the apparatus is provided.

The apparatus further comprises an end 104 and an opposite end (not shown), which can for example have connectors or interfaces appropriate in electronic devices, such as communication ports or speakers.

The first display 110 shows a content 115 to the user of the device. In this example, the content 115 is an electronic newspaper. The first surface 101 is mainly covered by the first display 110. In certain example embodiments, the first display 110 covers the whole first surface 101. In other example embodiments, the first surface 101 can, in addition to the first display 110, comprise border areas 122, 132, 142 and 152 around the first display 110, or on the left and/or right and/or top and/or bottom side only. On such a border area can be located for example a microphone, certain buttons, additional display elements, indicator lights, or similar.

In certain example embodiments, the first display 110 forms a bigger display together with, for example, a display on the second surface 102, wherein the formed display extends over the edge or border 112 between the first surface 101 and the second surface 102. A corresponding bigger display can be arranged over the edge or border 113 between first surface 101 and the third surface 103. With such an arrangement, the first page of the electronic newspaper can be shown on the first display 110 and the second page on the second display on the second surface 102. The user can then continue reading the content 115 on another side of the apparatus by flipping it. In certain example embodiments, the apparatus provides the user with the function of scrolling the content 115 from one surface to another surface by sliding the finger on the display or near the display 110.

Figure 2:
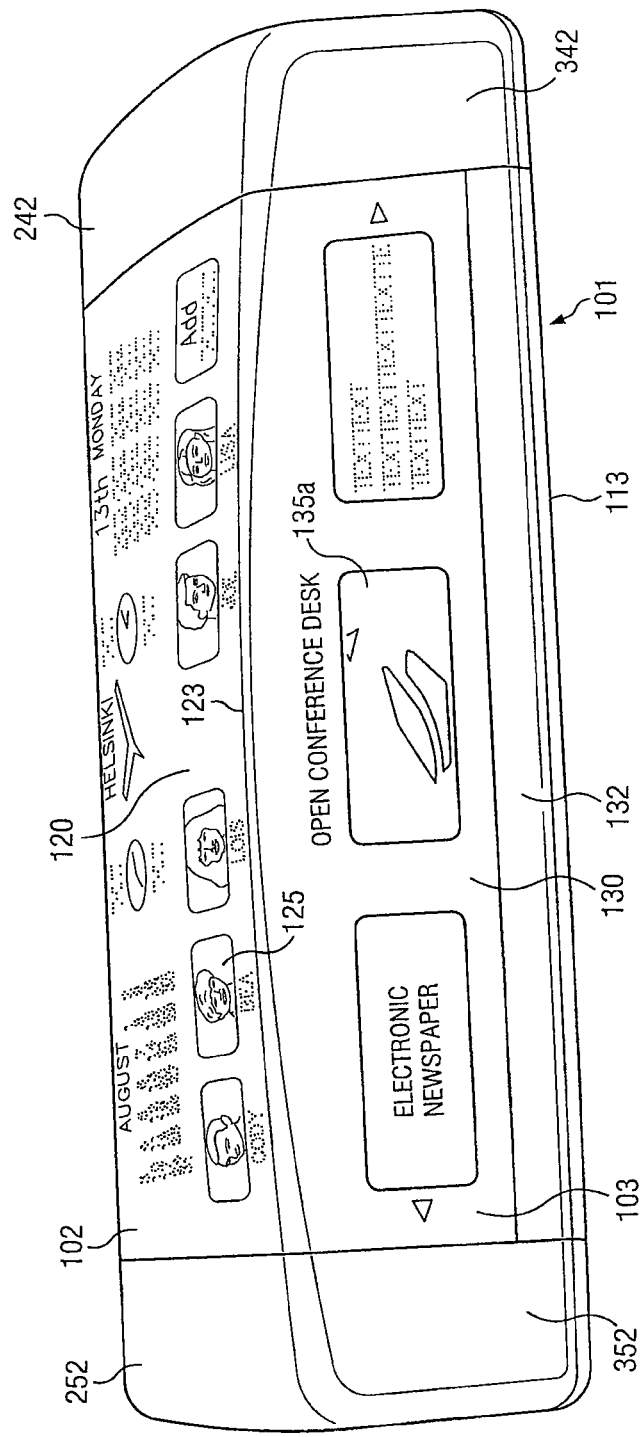
FIG. 2 shows a schematic drawing of the apparatus of FIG. 1 standing in a second operating position with a first appearance according to an example embodiment.

FIG. 2 shows a schematic drawing of the apparatus of FIG. 1 standing in a second operating position with a first appearance according to an example embodiment. Visible is the second surface 102 providing the second display 120. In this example, the second display 120 is a touch display, but other display types are possible.

Visible is also the third surface 103 providing the third display 130. In this example, the third display 130 is a touch display, but other display types are possible.

The border area surrounding the edge or border 123 between the second surface 102 and the third surface 103 may provide a gap between the second and the third displays 120 and 130, or alternatively, there is no gap between the second display 120 and the third display 130. In the latter case the second display 120 forms a bigger display together with the third display 130, wherein the formed display extends over the edge or border 123 between the second surface 102 and the third surface 103. In either case, the second display 120 and the third display 130 can be operated independently or dependently of each other. An example of the dependent case has been described in the foregoing (part of an electronic newspaper shown on one display and the next part on the other display).

In the independent case displays can be used for mutually different purposes, such as shown in the example of FIG. 2, where the second display 120 shows a first information content 125, such as the user's phonebook contacts, and a calendar, and the third display shows a second information content 135a, such as icons or links to interesting applications.

The second and third surfaces 102-103 are mainly covered by the second and third displays 120 and 130, respectively. In certain example embodiments, the second display 120 covers the whole second surface 102, and the third display 130 covers the whole third surface 103. In other example embodiments, the second and third surfaces 102-103 can, in addition to the second and third displays 120 and 130, comprise border areas around the second and third display 120 and 130, or on the left and/or right and/or top and/or bottom side of the display concerned only. FIG. 2 shows such a border areas on the left and right sides of the second and third displays 120 and 130, that is, border areas 242, 252, 342 and 352. In addition, visible in FIG. 2 is the border area 132 on the bottom side of the third display 103. On such border areas can be located for example a microphone, certain buttons, additional display elements, indicator lights, or similar.

In certain example embodiments, the apparatus provides the user with the function of controlling, from one of the displays, information content in another one of the displays. In certain example embodiments, the apparatus is configured so that the user can transfer information from one of the displays to another one of the displays, for example, by dragging or clicking. For example, the user can, depending on the implementation, drag by using her/his finger or a stylus an electronic newspaper icon or minimized view from the third display 130 to the first display 110 whereby the newspaper opens in a readable format on the first display 110. In certain example embodiments, the user can drag by using her/his finger or a stylus an icon or link towards the second display 120 whereby the link or the application associated with the icon opens in the second display 120. Alternatively, the same functions can in certain example embodiments be achieved in other ways, such as by a click scheme (such as a double or triple click).

Figure 3:
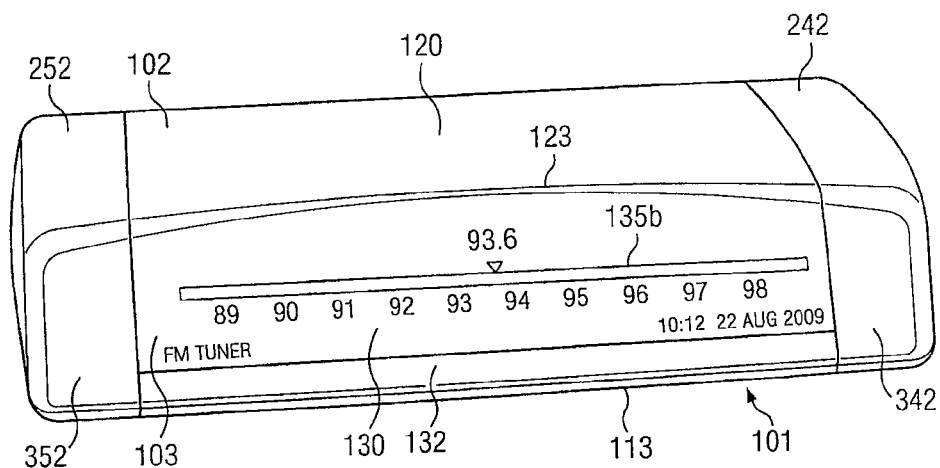
FIG. 3 shows a schematic drawing of the apparatus of FIG. 1 standing in the second operating position with a second appearance according to an example embodiment.

In certain example embodiments, the apparatus is configured to provide the user with different appearances. In certain example embodiments, the apparatus is configured so that the user can customize the appearance of the apparatus according to her/his own preferences. Via operating one or more of the displays 110, 120 and 130, the user is enabled to change the information content or appearance of any particular display 110, 120 and/or 130. FIG. 3 shows an appearance 135b of the third display 130 constantly showing radio and time information.

Figure 4:
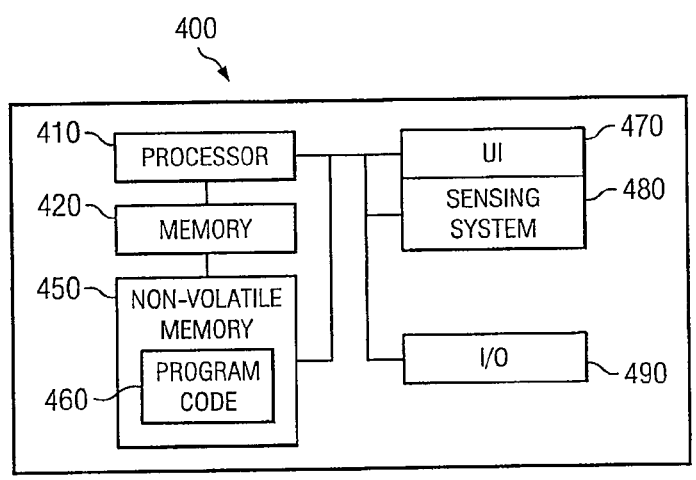
FIG. 4 shows an example block diagram of an apparatus according to certain example embodiments.

FIG. 4 shows an example block diagram of an apparatus 400 according to certain example embodiments of the invention. The apparatus 400 is suitable for functioning as the apparatus 100 described in the foregoing.

The apparatus 400 comprises at least one non-volatile memory 450 configured to store computer programs or software comprising computer program code 460. The apparatus 400 further comprises at least one processor 410 for controlling the operation of the apparatus 400 using the computer program code 460, a work memory 420 for running the computer program code 460 by the at least one processor 410, and an input/output system (or communication unit) 490 for communicating with other entities or apparatuses. The apparatus 400 comprises a user interface 470 including at least the displays described in the foregoing. The apparatus further comprises a sensing system 480 in connection with the displays. The sensing system 480 senses or detects touches, clicking, and finger or stylus movements on the displays in the manner known us such to the skilled person. In certain example embodiments, the user does not even have to touch the display, but a mere movement near the display is sensed. The sensing system 480 is connected to the at least one processor 410. The at least one processor 410 can control the operation of the sensing system 480 in accordance with the program code 460.

The at least one processor 410 may be a master control unit (MCU). Alternatively, the at least one processor 410 may be a microprocessor, a digital signal processor (DSP), an application specific integrated circuit (ASIC), a field programmable gate array, a microcontroller or a combination of such elements.

The apparatus 400 is generally operated by the at least one processor 410 based on the program code 460. As to the operations of the embodiments of the invention, when the computer program code 460 is executed by the at least one processor 410, and the at least one processor 410 receives from the sensing means 480 input indicative of touches on one or more displays, this causes the apparatus 400 to implement operations in different embodiments. These operations can, among other things, comprise controlling content or information on one or more of the displays of the generally triangle shaped apparatus based on a detected touch action or detected touch actions, and other operations as described or referenced in the foregoing.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus comprising:
   a first surface having at least one display;
   a second surface having at least one display; and
   a third surface having at least one display, wherein
   said first, second and third surface form an outer surface of the apparatus, the outer surface being generally of a triangular shape; and wherein
   at least two of said displays form one continuous bigger display, wherein the formed display extends over at least one border between two of the first, second and third surfaces; and
   wherein there is no gap between the said at least two displays forming one continuous bigger display.

2. An apparatus according to claim 1, wherein at least one of the first, second and third surfaces is substantially planar.

3. An apparatus according to claim 2, wherein at least one other of the first, second and third surfaces is either convex or concave.

4. An apparatus according to claim 1, wherein at least one of the first, second and third surfaces is bigger than the other surfaces, and wherein that surface is substantially planar providing a planar display.

5. An apparatus according to claim 1, wherein at least one of the displays is a touch display.

6. An apparatus according to claim 1, wherein the apparatus is configured to show same content in at least two of the displays.

7. An apparatus according to claim 1, wherein the apparatus is configured to show a first part of a content in one of the displays and a second part of the content in another one of the displays.

8. An apparatus according to claim 1, wherein the apparatus is configured to show an icon or a link to a content in one of the displays and to show the content in another one of the displays.

9. An apparatus according to claim 1, wherein the apparatus is configured to show an icon or a link to a content in one of the displays and to activate the content in another one of the displays from the icon or link.

10. An apparatus according to claim 1, wherein the apparatus is configured to transfer information between the displays as controlled by a user.

11. An apparatus according to claim 1, wherein the apparatus is configured to provide a user with a function in which the user drags information from one of the displays to another one of the displays.

12. An apparatus according to claim 1, wherein the displays are configured to operate independently.

13. An apparatus according to claim 1, wherein the apparatus is configured to show different content on each of the displays.

14. An apparatus according to claim 1, wherein the first, second and third surfaces are mostly covered by the displays.

15. An apparatus according to claim 1, wherein the apparatus is a mobile handheld electronic device.

16. A computer program embodied on a computer readable non-transitory medium comprising computer executable program code which, when executed by at least one processor of an apparatus comprising a first surface having at least one display, a second surface having at least one display, and a third surface having at least one display, wherein said first, second and third surface form an outer surface of the apparatus, the outer surface being generally of a triangular shape and wherein at least two of said displays form one continuous bigger display, wherein the formed display extends over at least one border between two of the first, second and third surfaces; and wherein there is no gap between the said at least two displays forming one continuous bigger display, causes the apparatus to perform:
  operating the apparatus and controlling the use of each of the displays.

17. An apparatus comprising:
  a first surface having at least one display; and
  a second surface having at least one display; and
  a third surface; wherein said first, second and third surface form an outer surface of the apparatus, the outer surface being generally of a triangular shape; and wherein
  said displays form one continuous bigger display, wherein the formed display extends over the border between the first and second surface; and
  wherein there is no gap between said displays forming one continuous bigger display.

18. An apparatus according to claim 17, wherein at least one of the first and second surfaces is substantially planar.

19. An apparatus according to claim 18, wherein at least one of the first and second surfaces is either convex or concave.

20. An apparatus according to claim 17, wherein at least one of the first and second surfaces is bigger than the other surface, and wherein that surface is substantially planar providing a planar display.

21. An apparatus according to claim 17, wherein at least one of the displays is a touch display.

22. An apparatus according to claim 17, wherein the apparatus is configured to show same content in both displays.

23. An apparatus according to claim 17, wherein the apparatus is configured to show a first part of a content in one of the displays and a second part of the content in the other display.

24. An apparatus according to claim 17, wherein the apparatus is configured to show an icon or a link to a content in one of the displays and to show the content in the other display.

25. An apparatus according to claim 17, wherein the apparatus is configured to show an icon or a link to a content in one of the displays and to activate the content in the other display from the icon or link.

26. An apparatus according to claim 17, wherein the apparatus is configured to transfer information between the displays as controlled by a user.

27. An apparatus according to claim 17, wherein the apparatus is configured to provide a user with a function in which the user drags information from one of the displays to the other display.

28. An apparatus according to claim 17, wherein the displays are configured to operate independently.

29. An apparatus according to claim 17, wherein the apparatus is configured to show different content on both displays.

30. An apparatus according to claim 17, wherein the first and second surfaces are mostly covered by the displays.

31. An apparatus according to claim 17, wherein the apparatus is a mobile handheld electronic device.

32. A computer program embodied on a computer readable non-transitory medium comprising computer executable program code which, when executed by at least one processor of an apparatus comprising a first surface having at least one display, a second surface having at least one display, and a third surface, wherein said first, second and third surface form an outer surface of the apparatus, the outer surface being generally of a triangular shape and wherein at least two of said displays form one continuous bigger display, wherein the formed display extends over the border between the first and second surfaces, and wherein there is no gap between said displays forming one continuous bigger display causes the apparatus to perform:
  operating the apparatus and controlling the use of both displays.

* * * * *